US009631564B2

(12) United States Patent
Ossareh et al.

(10) Patent No.: US 9,631,564 B2
(45) Date of Patent: *Apr. 25, 2017

(54) METHODS AND SYSTEM FOR DETERMINING COMPRESSOR RECIRCULATION VALVE SLUDGE

(71) Applicant: Ford Global Technologies, LLC, Dearborn, MI (US)

(72) Inventors: Hamid-Reza Ossareh, Ann Arbor, MI (US); Baitao Xiao, Canton, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/566,442

(22) Filed: Dec. 10, 2014

(65) Prior Publication Data

US 2016/0169092 A1 Jun. 16, 2016

(51) Int. Cl.

| | |
|---|---|
| F02B 33/00 | (2006.01) |
| F02D 41/00 | (2006.01) |
| F02B 37/16 | (2006.01) |
| F02D 41/22 | (2006.01) |
| F02B 39/16 | (2006.01) |
| F02B 37/18 | (2006.01) |
| F02D 11/10 | (2006.01) |

(52) U.S. Cl.
CPC .......... *F02D 41/0007* (2013.01); *F02B 37/16* (2013.01); *F02D 41/221* (2013.01); *F02B 37/18* (2013.01); *F02B 2039/162* (2013.01); *F02D 2011/108* (2013.01); *F02D 2200/0406* (2013.01); *Y02T 10/144* (2013.01); *Y02T 10/40* (2013.01)

(58) Field of Classification Search
CPC ...... F02B 37/18; F02B 37/186; F02D 41/007; F02D 41/001
USPC ....................... 123/399, 559.1; 60/600, 605.1
See application file for complete search history.

(56) References Cited

U.S. PATENT DOCUMENTS

| | | | |
|---|---|---|---|
| 2,988,070 A | 6/1961 | Brueder | |
| 4,513,571 A * | 4/1985 | Jenny | F02B 33/42 60/603 |
| 4,817,387 A * | 4/1989 | Lashbrook | F02B 37/16 60/600 |
| 4,870,822 A | 10/1989 | Kamimaru | |
| 5,079,946 A | 1/1992 | Motamedi | |
| 5,275,136 A | 1/1994 | Schechter | |

(Continued)

OTHER PUBLICATIONS

Watson, N. et al., "Turbocharging the Internal Combustion Engine," John Wiley & Sons, 1982, pp. 129-133, 3 pages.

(Continued)

*Primary Examiner* — John Kwon
(74) *Attorney, Agent, or Firm* — Julia Voutyras; McCoy Russell LLP

(57) ABSTRACT

Systems and methods for determining the presence or absence of deposits that may accumulate within a compressor recirculation valve positioned in parallel with a turbocharger compressor are presented. The systems and methods adjust actuators to maintain engine operation such that it may be more difficult for a driver to become aware that a compressor recirculation valve diagnostic is being executed.

20 Claims, 4 Drawing Sheets

(56) References Cited

U.S. PATENT DOCUMENTS

| | | |
|---|---|---|
| 7,578,128 B2 | 8/2009 | Miyauchi |
| 8,373,950 B2 | 2/2013 | Yano |
| 8,661,814 B2 | 3/2014 | Ulrey |
| 2012/0210711 A1 | 8/2012 | Petrovic et al. |
| 2012/0291432 A1 | 11/2012 | Ulrey et al. |
| 2014/0260241 A1 | 9/2014 | Jankovic et al. |
| 2016/0169089 A1* | 6/2016 | Xiao .................. F02D 41/0007 701/103 |
| 2016/0169091 A1* | 6/2016 | Banker ................ F02B 37/186 701/103 |

OTHER PUBLICATIONS

Xiao, Baitao et al. "Methods and Systems for Real-Time Compressor Surge Line Adaptation," U.S. Appl. No. 14/563,749, filed Dec. 8, 2014, 53 pages.

Ossareh, Hamid-Reza et al., "System and Methods for CBV Diagnostics," U.S. Appl. No. 14/537,216, filed Nov. 10, 2014, 29 pages.

Banker, Adam N. et al., "Diagnostic Method for a Compressor Recirculation Valve," U.S. Appl. No. 14/565,098, filed Dec. 9, 2014, 56 pages.

Banker, Adam N. et al., "Methods and System for Compensating Compressor Recirculation Sludge," U.S. Appl. No. 14/566,395, filed Dec. 10, 2014, 27 pages.

Xiao, Baitao et al., "Methods and System for Improving Compressor Recirculation Valve Operation," U.S. Appl. No. 14/566,488, filed Dec. 10, 2014, 27 pages.

\* cited by examiner

METHODS AND SYSTEM FOR DETERMINING COMPRESSOR RECIRCULATION VALVE SLUDGE

FIELD

The present description relates to methods and a system for determining whether or not sludge may have accumulated within a compressor recirculation valve. The methods and systems may be particularly useful in engines having turbochargers or superchargers.

BACKGROUND AND SUMMARY

A supercharged or turbocharged engine may include a compressor recirculation valve for relieving pressure downstream of a compressor during conditions where it may not be desirable to provide greater pressure than atmospheric pressure upstream of a throttle. For example, if a driver is requesting a relatively high driver demand torque followed by a low driver demand torque, it may be desirable to reduce pressure upstream of an engine intake manifold throttle so that the engine may provide torque closer to the driver demand torque. The pressure downstream of a compressor may be relieved via opening a compressor recirculation valve in response to the low driver demand torque. However, air in an engine intake system may be mixed with fuel vapors and contaminants that may pass through the engine's air intake filter. The fuel vapors and contaminants may build up over time in the compressor recirculation valve causing a change in the compressor recirculation valve's flow characteristics. Therefore, the compressor recirculation valve may not provide an expected amount of airflow during some conditions.

The inventors herein have recognized the above-mentioned issues and have developed a diagnostic method, comprising: partially opening a waste gate and adjusting a compressor recirculation valve to a closed position in response to a diagnostic request; incrementally opening the compressor recirculation valve after the compressor recirculation valve is closed; adjusting a compressor recirculation valve airflow offset in response to waste gate position while incrementally opening the compressor recirculation valve from the closed position; and operating the compressor recirculation valve in response to the airflow offset.

By adjusting a compressor recirculation valve airflow offset in response to a waste gate position, it may be possible to provide the technical result of improving engine air intake pressure control even when deposits are formed within a compressor recirculation valve. In one example, the recirculation valve airflow offset may be determined based on a change in position of the waste gate when the waste gate is closed loop controlled to maintain a desired pressure at an inlet of an engine intake manifold throttle. Specifically, the recirculation valve may be first closed and then incrementally opened. The recirculation valve opening position where the waste gate position is changed to maintain constant engine intake manifold throttle inlet pressure may be determined to be the compressor recirculation valve offset value. The waste gate position may be adjusted in response to pressure at the inlet of the engine intake manifold throttle to maintain engine airflow and reduce the possibility of disturbing a driver.

The present description may provide several advantages. For example, the approach may improve engine airflow at low driver demand levels. Further, the approach may improve engine air-fuel ratio control during accelerator pedal tip-out conditions. Further, the approach may be applied to turbocharged or supercharged engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
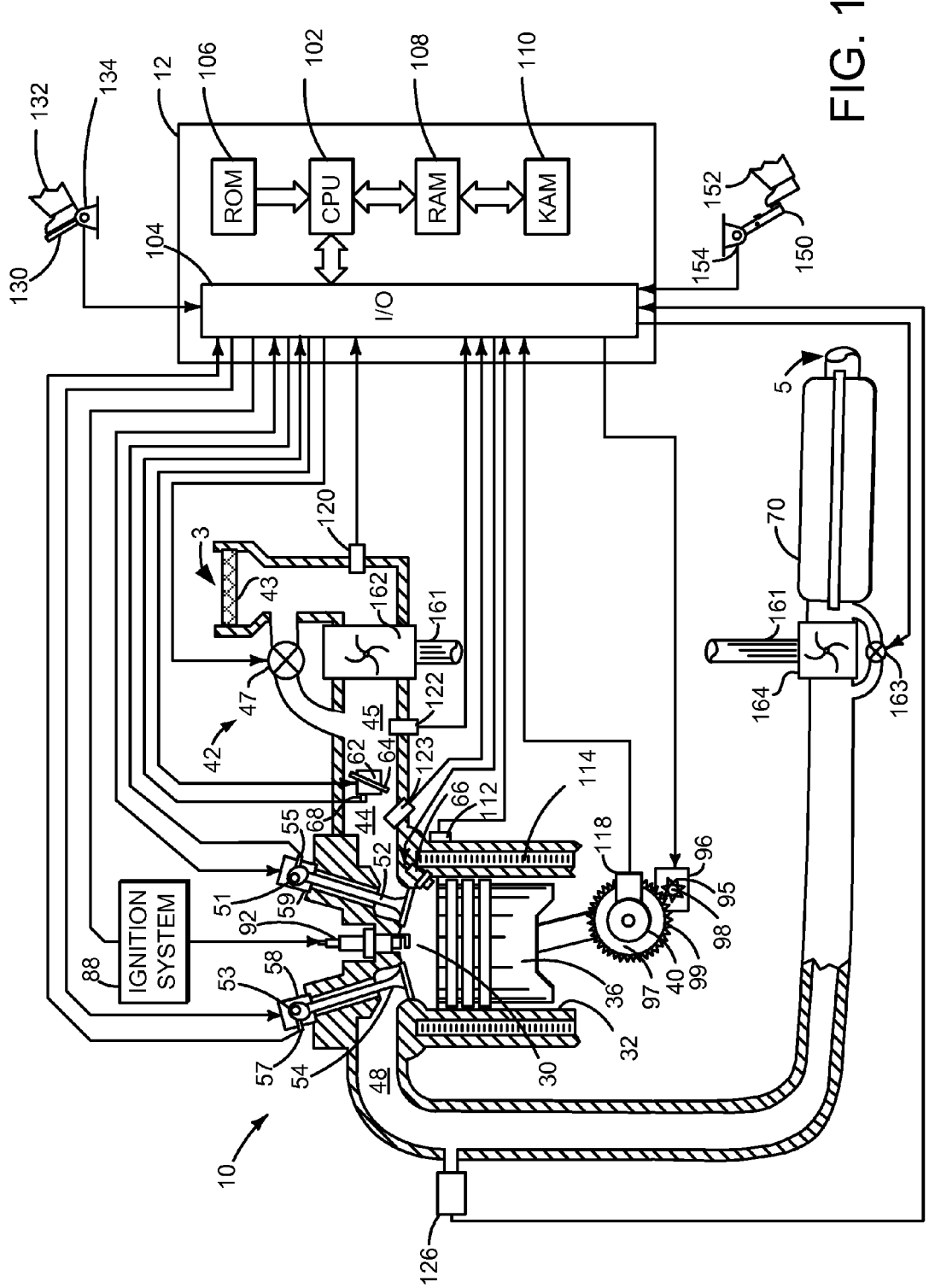
FIG. 1 is a schematic diagram of an engine.

The present description is related to operating an engine with a compressor recirculation valve. The compressor recirculation valve may be incorporated into an engine as is shown in FIG. 1. The compressor recirculation valve may exhibit flow characteristics similar to those shown in FIG. 2. The engine may be part of a system that includes a controller with instructions for the method of FIG. 3. The system of FIG. 1 and the method of FIG. 3 may operate to provide the sequence of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Combustion byproducts are exhausted at outlet 5 which is exposed to ambient temperature and pressure. Piston 36 and combustion chamber 30 operate as a pump when engine 10 rotates and combusts air and fuel. Air is drawn from inlet 3 and exhaust products are expelled at outlet 5. Inlet 3 is upstream of outlet 5 according to the direction of flow through engine 10, exhaust manifold 48, and engine air intake 42. Upstream of engine 10 does not include anything outside the engine past the inlet, and downstream of engine 10 does not include anything outside the engine past the outlet.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a system, comprising: an engine; a turbocharger including a compressor mechanically coupled to the engine, the turbocharger including a waste gate; a recirculation valve positioned in an air intake of the engine in parallel with the compressor; and a controller including instructions stored in non-transitory memory for adjusting a position of the waste gate to maintain engine intake manifold throttle inlet pressure at a constant pressure and adjust a transfer function of the recirculation valve in response to a position of the recirculation valve that causes the position of the waste gate to be adjusted to maintain engine intake manifold throttle inlet pressure. The system further comprises additional instructions to closed loop control the waste gate to maintain engine intake manifold throttle inlet pressure.

In some examples, the system includes where an offset value of the transfer function is adjusted. The system further comprises additional instructions to incrementally open the recirculation valve. The system includes where the position of the recirculation valve is a position where air begins to recirculate from an output of a compressor to an inlet of the compressor. The system further comprises additional instructions for exiting a recirculation valve diagnostic mode in response to an increase in driver demand torque. The system further comprises additional instructions to operate the recirculation valve in response to the transfer function.

Figure 2:
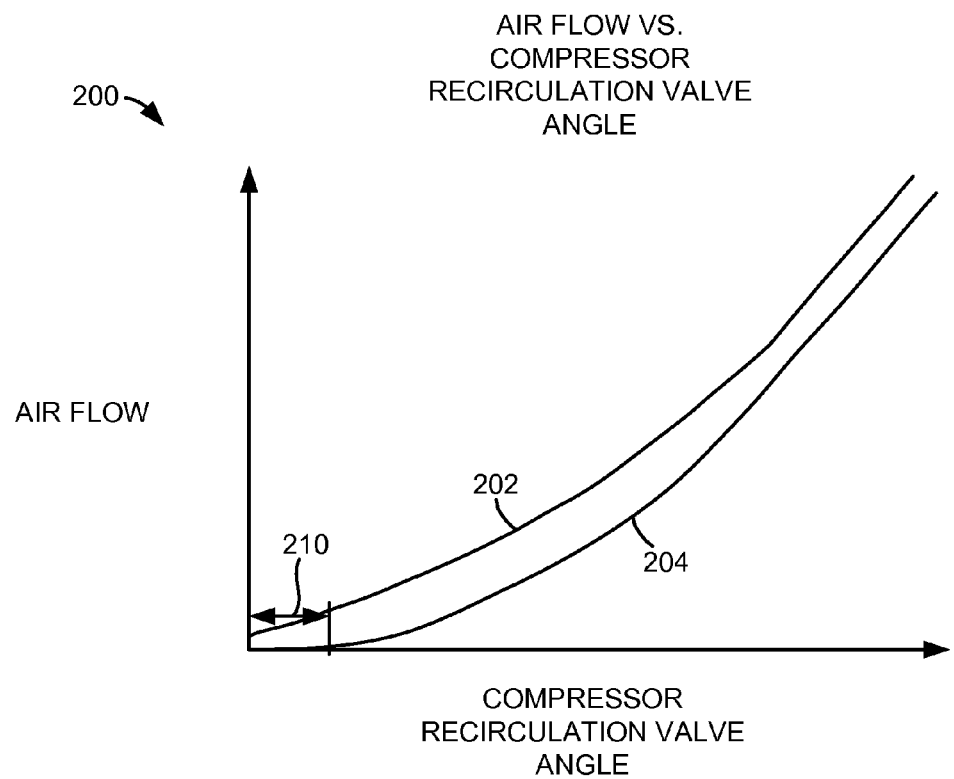
FIG. 2 is a plot shown flow of a throttle and flow of a throttle with deposits.

Referring now to FIG. 2, a prophetic plot of airflow versus compressor recirculation valve angle for a fixed pressure drop across a compressor recirculation valve is shown. The X axis represents compressor recirculation valve angle. The angle increases in the direction of the X axis arrow and the compressor recirculation valve opening amount increases as the angle increases. The Y axis represents airflow through the compressor recirculation valve. Curve 202 represents characteristics for a compressor recirculation valve that is free of deposits, and curve 204 represents characteristics for a compressor recirculation valve that has deposits. Deposits may form from fuel vapors and/or material inducted into the engine. Curves 202 and 204 may be referred to as compressor recirculation valve transfer functions since they describe compressor recirculation input (e.g., angle) versus output (e.g., airflow) for a given pressure ratio across the compressor recirculation valve.

The plot shows that the compressor recirculation valve with deposits (e.g., curve 204) begins to allow air flow at a greater angle than the compressor recirculation valve without deposits (e.g., curve 202). The deposits may partially restrict flow through the compressor recirculation valve. Therefore, if a controller adjusts an angle of the compressor recirculation valve with deposits, there may not be airflow for conditions where the controller is expecting airflow. Consequently, it may be more difficult to control pressure at a location upstream of a central throttle or engine intake manifold throttle. Leader 210 shows an offset between curve 202 and curve 204. The offset represents a compressor recirculation valve angle difference between where airflow begins through the compressor recirculation valve without deposits and the compressor recirculation valve with deposits. Thus, by determining when airflow begins through the compressor recirculation valve, the offset in compressor recirculation valve angle may be determined.

Figure 3:
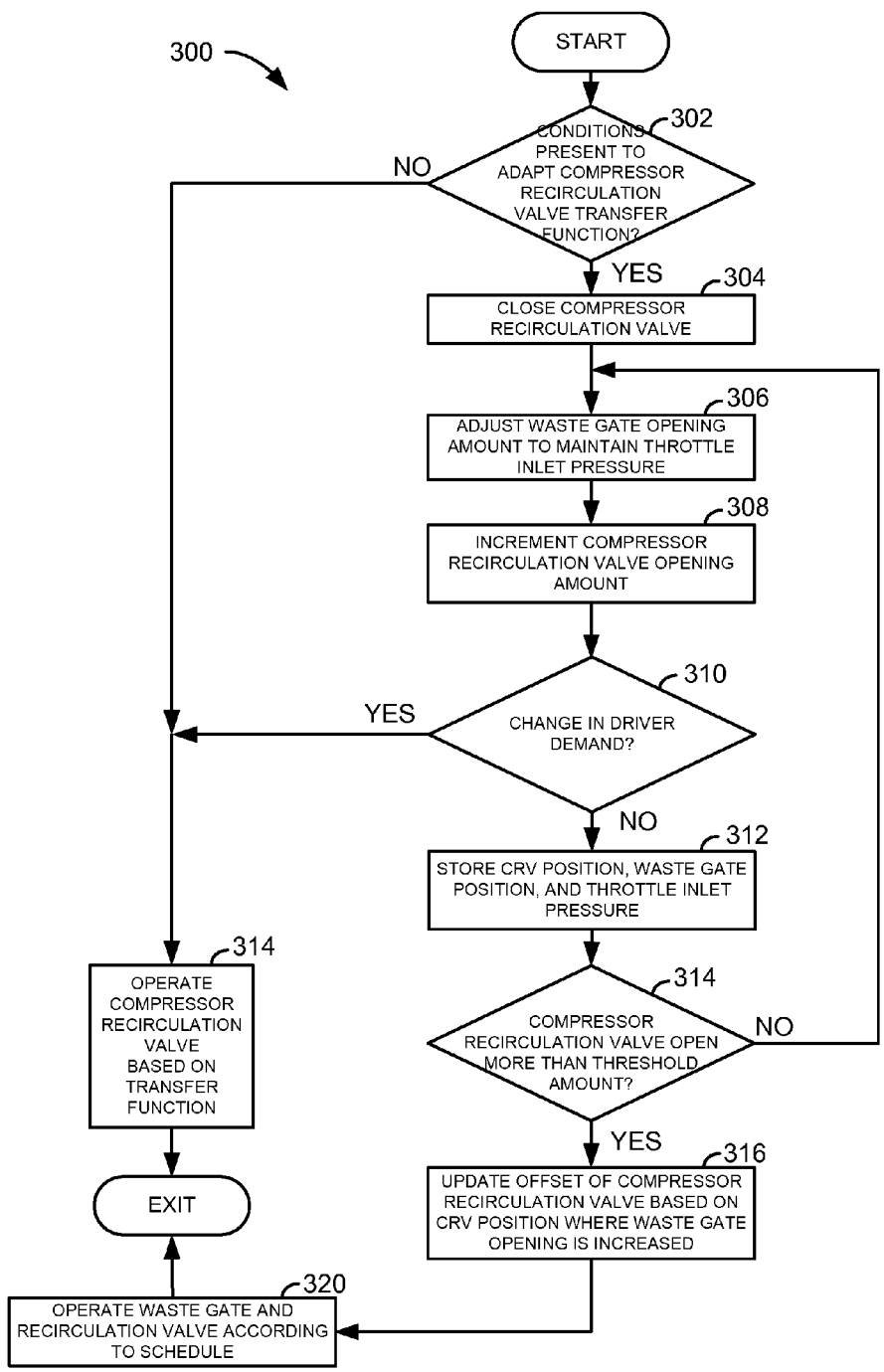
FIG. 3 shows an example method for operating an engine.

Referring now to FIG. 3, a method for operating an engine is shown. The method of FIG. 3 may provide the operating sequence shown in FIG. 4. Additionally, the method of FIG. 3 may be included in the system of FIG. 1 as executable instructions stored in non-transitory memory.

At 302, method 300 judges if conditions are present for adapting a compressor recirculation valve transfer function. In one example, conditions may be present for adapting or revising a compressor recirculation valve transfer function when the engine is operating within a predetermined engine speed and load range. A request to enter a compressor recirculation valve diagnostic mode may be made in response to conditions being present for adapting the compressor recirculation valve transfer function. Further, it may be desirable to operate the engine at a substantially constant engine speed and load (e.g., changing by less than five percent). If method 300 judges that conditions are present for adapting the compressor recirculation valve transfer function, the answer is yes and method 300 proceeds to 304. Otherwise, the answer is no and method 300 proceeds to 314.

At 314, method 300 operates the compressor recirculation valve based on the compressor recirculation valve's present transfer function. For example, if the pressure in the boost chamber or inlet of the engine's throttle is greater than desired, the compressor recirculation valve may be adjusted to an angle where airflow through the compressor recirculation valve begins to increase based on the compressor recirculation valve's transfer function. In this way, the engine intake manifold throttle inlet pressure may be maintained at a desired level. In some examples, the compressor recirculation valve position may be adjusted in response to a difference between a desired engine throttle inlet pressure and an actual engine throttle inlet pressure. Method 300 proceeds to exit after the compressor recirculation valve position is adjusted according to the present compressor recirculation valve transfer function.

At 304, method 300 fully closes the compressor recirculation valve. By closing the compressor recirculation valve, it may be established that airflow through the compressor recirculation valve is substantially zero (e.g., less than one percent of maximum flow through the compressor recirculation valve). Method 300 proceeds to 306 after the compressor recirculation valve is closed.

At 306, method 300 positions the turbocharger waste gate to maintain a predetermined desired engine intake manifold throttle inlet pressure. In one example, the turbocharger waste gate is closed loop controlled to provide a desired pressure at an inlet of an engine intake manifold throttle. If pressure at the inlet is too low, the waste gate is at least partially closed. If pressure at the inlet is too high, the waste gate is at least partially opened. Engine intake manifold pressure may be subtracted from a desired engine intake manifold pressure to provide an error value, and the error value may be multiplied by proportional and integral terms. The result of multiplying the error by the proportional term may be added to the result of multiplying the error by the integral term. The result of the addition may be the basis for adjusting the waste gate position. Method 300 proceeds to 308 after the waste gate position is adjusted.

At 308, method 300 increments the compressor recirculation valve opening amount by a predetermined amount (e.g., two degrees). The predetermined amount may be based on the present engine speed and load. By incrementing the compressor recirculation valve opening amount, the compressor recirculation valve opening amount is increased. Air flows from the compressor outlet to the compressor inlet when the compressor recirculation valve is opened sufficiently to allow airflow. Method 300 proceeds to 310 after the compressor recirculation valve opening amount has been incremented.

At 310, method 300 judges if there has been a change in driver demand torque greater than an absolute threshold amount after the compressor recirculation valve was closed at 304. If so, the answer is yes and method 300 proceeds to 314 and exits the compressor recirculation valve adaption or revision mode. Otherwise, the answer is no and method 300 proceeds to 312.

At 314, method 300 stores the present compressor recirculation valve (CRV) position, waste gate position, and central throttle inlet pressure to controller memory. The compressor recirculation valve position, the central throttle position, and the central throttle inlet pressure may be measured or inferred. Method 300 proceeds to 316 after the present compressor recirculation valve position, waste gate position, and central throttle inlet pressure are stored to controller memory.

At 316, method 300 judges if the compressor recirculation valve is open more than a predetermined amount. In one example, the predetermined amount is a value greater than twenty five percent of the compressor recirculation valve's total opening amount. If the compressor recirculation valve opening amount has been incremented to a value greater than the threshold amount, the answer is yes and method 300 proceeds to 316. Otherwise, the answer is no and method 300 returns to 306.

At 316, method 300 updates or revises the offset value in the compressor recirculation transfer function. In one example, the offset is a compressor recirculation valve angle where flow through the compressor recirculation valve is determined based on a change in turbocharger waste gate position. For example, if the compressor recirculation valve opens and the waste gate is closed to maintain pressure at the inlet of the central throttle, the valve angle of the offset is the compressor recirculation valve angle where the waste gate position changed (e.g., closed). In particular, the offset may be established where the waste gate closes in response to the central throttle opening amount increasing after the compressor recirculation is closed and constant engine manifold throttle inlet pressure is established. The waste gate opening decreasing based on closed loop waste gate control to maintain constant engine intake manifold inlet pressure. Additionally, the remaining values in the compressor recirculation valve's transfer function may be adjusted based on the new offset value. In one example, predetermined amounts (e.g., compressor recirculation valve angle increases) are added to the present values in the compressor recirculation valve transfer function based on the new offset value. For example, if the new offset value is increased from two degrees to four degrees, the compressor recirculation valve angle that corresponds to a flow rate of X Kg/sec may be increased by two degrees. The two degree increase may be empirically determined and stored to memory based on the present compressor recirculation valve offset. Additionally, all other entries in the compressor recirculation valve transfer function may be revised in a similar way. Method 300 proceeds to 324 after the compressor recirculation valve transfer function is revised.

At 320, method 300 operates the compressor recirculation valve based on the revised compressor recirculation valve transfer function according to predetermined scheduled operation. For example, if pressure at the throttle inlet is greater than desired, the compressor recirculation valve position may be adjusted to the offset value so that air flows through the compressor recirculation valve, thereby reducing the throttle inlet pressure. Additionally, the engine throttle and waste gate are operated according to schedule (e.g., based on engine speed, load, and driver demand torque). Thus, engine throttle control, waste gate control, and compressor recirculation valve control are returned to standard operation when the compressor recirculation valve adaption mode is complete. Method 300 proceeds to exit after the waste gate and compressor recirculation valve resume standard operation.

Thus, the method of FIG. 3 provide for a diagnostic method, comprising: partially opening a waste gate and adjusting a compressor recirculation valve to a closed position in response to a diagnostic request; incrementally opening the compressor recirculation valve after the compressor recirculation valve is closed; adjusting a compressor recirculation valve airflow offset in response to waste gate position while incrementally opening the compressor recirculation valve from the closed position; and operating the compressor recirculation valve in response to the airflow offset. The method includes where the diagnostic request is a request to adjust the compressor recirculation valve airflow offset. The method further comprises adjusting the waste gate position in response to an throttle inlet pressure.

In some examples, the method includes where the waste gate position is adjusted to maintain a pressure at a throttle inlet. The method includes where the waste gate position is closed while incrementally opening the compressor recirculation valve. The method includes where the recirculation valve is incrementally opened during a recirculation valve adaptation mode, and further comprising exiting the recirculation valve adaptation mode in response to an increase in driver demand torque. The method includes where the recirculation valve airflow offset is an opening position of the recirculation valve where airflow greater than a threshold amount is present.

The method of FIG. 3 also provides for a diagnostic method, comprising: partially opening a waste gate, adjusting a compressor recirculation valve to a closed position, and maintaining a constant engine throttle inlet pressure via adjusting a position of the waste gate in response to a diagnostic request; incrementally opening the compressor recirculation valve after the compressor recirculation valve is closed; adjusting a recirculation valve transfer function in response to a position of the compressor recirculation valve where the waste gate position is first adjusted after the compressor recirculation valve is closed and the constant engine throttle inlet pressure is maintained; and operating the recirculation valve in response to the recirculation valve transfer function. The method includes where waste gate is closed in response to a reduction in engine throttle inlet pressure. The method includes where the diagnostic request is a compressor recirculation valve diagnostic request.

In some examples, the method includes where the diagnostic request initiates a diagnostic mode, and further comprising holding an engine intake manifold throttle at a constant position during the diagnostic mode. The method further comprises exiting the diagnostic mode in response to an increase in driver demand torque. The method also includes where the compressor recirculation valve is positioned in parallel with a compressor.

Figure 4:
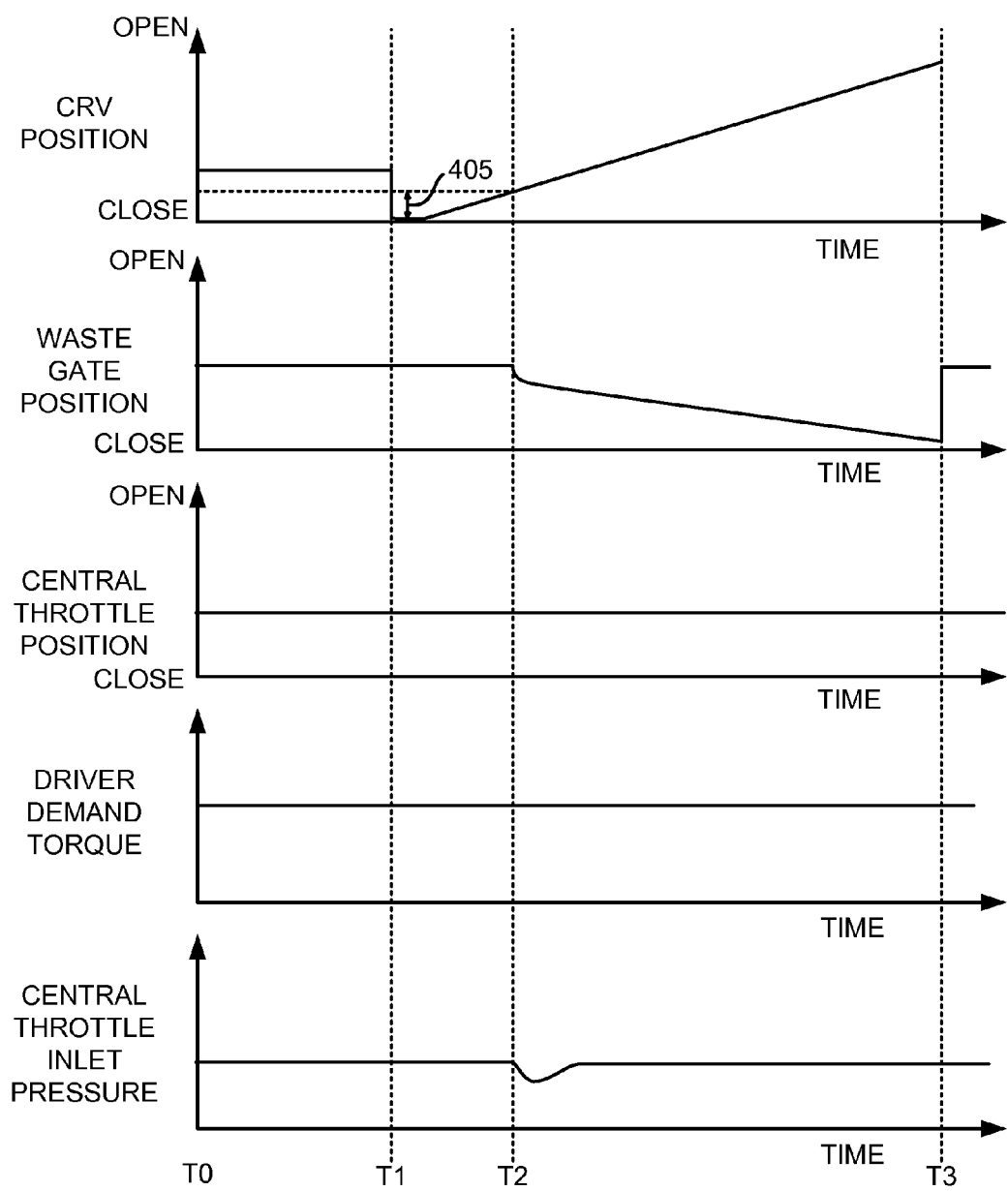
FIG. 4 shows an engine operating sequence based on the method of FIG. 3.

Referring now to FIG. 4, a sequence for operating an engine according to the method of FIG. 3 is shown. The sequence may be provided via the system of FIG. 1. Vertical lines at time T1-T3 represent times of interest during the sequence.

The first plot from the top of FIG. 4 is a plot of compressor recirculation valve (CRV) position versus time. The Y axis represents CRV position and the CRV opening amount increases in the direction of the Y axis arrow. The X axis represents time and time increases from the left side of the figure to the right side of the figure.

The second plot from the top of FIG. 4 is a plot of turbocharger waste gate position versus time. The Y axis represents turbocharger waste gate position and the waste gate opening amount increases in the direction of the Y axis arrow. The X axis represents time and time increases from the left side of the figure to the right side of the figure.

The third plot from the top of FIG. 4 is a plot of the engine's central throttle position versus time. The Y axis represents central throttle position and the central throttle opening amount increases in the direction of the Y axis arrow. The X axis represents time and time increases from the left side of the figure to the right side of the figure.

The fourth plot from the top of FIG. 4 is a plot of driver demand torque versus time. The Y axis represents driver demand torque and driver demand torque increases in the direction of the Y axis arrow. The X axis represents time and time increases from the left side of the figure to the right side of the figure.

The fifth plot from the top of FIG. 4 is a plot of engine central throttle inlet pressure versus time. The Y axis represents engine central throttle inlet pressure versus time and the engine throttle inlet pressure increases in the direction of the Y axis arrow. The X axis represents time and time increases from the left side of the figure to the right side of the figure.

At time T0, the engine is not in a compressor recirculation valve diagnostic mode and the CRV position is partially open and the waste gate is partially open. The central throttle is partially open and the driver demand torque is a middle level. The engine throttle inlet pressure is at a middle level. These conditions may be indicative of operating the engine at part load.

At time T1, the engine enters a CRV diagnostic mode in response to operating conditions being conducive to updating a CRV transfer function. The CRV closes in response to entering the CRV diagnostic mode. The waste gate remains open and the central throttle is also partially open. The waste gate is closed loop controlled to maintain a constant engine intake manifold inlet pressure at a predetermined constant value. In one example, the waste gate position may be adjusted in response to central throttle inlet pressure. The driver demand torque and the central throttle inlet pressure remain at middle levels.

Between time T1 and time T2, the diagnostic is active and the CRV position is incremented in an effort to determine an angle where air begins to flow through the CRV. The waste gate remains partially open, the central throttle position remains unchanged, and the driver demand torque remains unchanged.

At time T2, compressor bypass valve position reaches an amount where air starts to flow through the compressor bypass valve. The airflow through the compressor bypass valve lowers pressure at the central throttle inlet, and the waste gate opening amount is decreased so that a compressor output may be increased to maintain a constant central throttle inlet pressure. The angle of the compressor bypass valve at time T2 is indicated by leader 405, the angle may be determined to be an offset value for a transfer function for the compressor bypass valve. The angle at 405 may be established as a compressor bypass valve angle where the waste gate position was adjusted after the compressor recirculation valve was closed and a constant engine intake manifold throttle inlet pressure was provided for the engine. The driver demand torque and the central throttle position remain unchanged.

At time T3, the compressor recirculation valve reaches a threshold value where the compressor recirculation valve diagnostic is ceased. For example, the compressor recirculation valve diagnostic may be ceased when the compressor recirculation valve opens more than twenty five percent of full scale opening amount. The compressor recirculation valve is closed or returned to a value based on present engine operating conditions. Further, the waste gate position is adjusted in response to closing the compressor recirculation valve. Consequently, the central throttle inlet pressure is maintained in response to closing the compressor recirculation valve.

In this way, the compressor recirculation valve offset may be determined based on a waste gate and/or a central throttle inlet pressure. Further, the remaining values in the compressor recirculation valve transfer function may be adjusted in response to the revised offset value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A diagnostic method, comprising:
partially opening a waste gate and adjusting a compressor recirculation valve to a closed position in response to a diagnostic request;
incrementally opening the compressor recirculation valve after the compressor recirculation valve is closed;
adjusting a compressor recirculation valve airflow offset in response to waste gate position while incrementally opening the compressor recirculation valve from the closed position; and
operating the compressor recirculation valve in response to the airflow offset.

2. The method of claim 1, where the diagnostic request is a request to adjust the compressor recirculation valve airflow offset.

3. The method of claim 1, further comprising adjusting the waste gate position in response to a throttle inlet pressure.

4. The method of claim 3, where the waste gate position is adjusted to maintain a pressure at a throttle inlet.

5. The method of claim 4, where the waste gate position is closed while incrementally opening the compressor recirculation valve.

6. The method of claim 1, where the compressor recirculation valve is incrementally opened during a compressor recirculation valve adaptation mode, and further comprising exiting the compressor recirculation valve adaptation mode in response to an increase in driver demand torque.

7. The method of claim 1, where the compressor recirculation valve airflow offset is an opening position of the compressor recirculation valve where airflow greater than a threshold amount is present.

8. A diagnostic method, comprising:
partially opening a waste gate, adjusting a compressor recirculation valve to a closed position, and maintaining a constant engine throttle inlet pressure via adjusting a position of the waste gate in response to a diagnostic request;
incrementally opening the compressor recirculation valve after the compressor recirculation valve is closed;

adjusting a recirculation valve transfer function in response to a position of the compressor recirculation valve where the waste gate position is first adjusted after the compressor recirculation valve is closed and the constant engine throttle inlet pressure is maintained; and operating the compressor recirculation valve in response to the recirculation valve transfer function.

9. The method of claim 1, where the waste gate is closed in response to a reduction in engine throttle inlet pressure.

10. The method of claim 8, where the diagnostic request is a compressor recirculation valve diagnostic request.

11. The method of claim 8, where the diagnostic request initiates a diagnostic mode, and further comprising holding an engine intake manifold throttle at a constant position during the diagnostic mode.

12. The method of claim 11, further comprising exiting the diagnostic mode in response to an increase in driver demand torque.

13. The method of claim 8, where the compressor recirculation valve is positioned in parallel with a compressor.

14. A system, comprising:
an engine;
a turbocharger including a compressor mechanically coupled to the engine, the turbocharger including a waste gate;
a recirculation valve positioned in an air intake of the engine in parallel with the compressor; and
a controller including instructions stored in non-transitory memory for adjusting a position of the waste gate to maintain engine intake manifold throttle inlet pressure at a constant pressure and adjust a transfer function of the recirculation valve in response to a position of the recirculation valve that causes the position of the waste gate to be adjusted to maintain engine intake manifold throttle inlet pressure.

15. The system of claim 14, further comprising additional instructions to closed loop control the waste gate to maintain engine intake manifold throttle inlet pressure.

16. The system of claim 14, where an offset value of the transfer function is adjusted.

17. The system of claim 14, further comprising additional instructions to incrementally open the recirculation valve.

18. The system of claim 14, where the position of the recirculation valve is a position where air begins to recirculate from an output of the compressor to an inlet of the compressor.

19. The system of claim 18, further comprising additional instructions for exiting a recirculation valve diagnostic mode in response to an increase in driver demand torque.

20. The system of claim 14, further comprising additional instructions to operate the recirculation valve in response to the transfer function.

* * * * *